US 8,520,348 B2

(12) United States Patent
Dong

(10) Patent No.: US 8,520,348 B2
(45) Date of Patent: Aug. 27, 2013

(54) HIGH-SWING DIFFERENTIAL DRIVER USING LOW-VOLTAGE TRANSISTORS

(75) Inventor: Yikui Jen Dong, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 63 days.

(21) Appl. No.: 13/335,056

(22) Filed: Dec. 22, 2011

(65) Prior Publication Data

US 2013/0163126 A1    Jun. 27, 2013

(51) Int. Cl.
*H03K 17/16* (2006.01)
(52) U.S. Cl.
USPC .............................. 361/56; 326/30
(58) Field of Classification Search
USPC .................... 361/56, 111; 326/30
See application file for complete search history.

(56) References Cited

U.S. PATENT DOCUMENTS

| | | | |
|---|---|---|---|
| 5,285,477 A | 2/1994 | Leonwich | |
| 5,977,796 A | 11/1999 | Gabara | |
| 6,124,727 A | 9/2000 | Bridgewater, Jr. et al. | |
| 6,373,275 B1 | 4/2002 | Otsuka et al. | |
| 6,433,579 B1 | 8/2002 | Wang et al. | |
| 7,599,461 B2 | 10/2009 | Aziz et al. | |
| 7,692,447 B2 | 4/2010 | Cranford, Jr. et al. | |
| 8,125,245 B2 * | 2/2012 | Flynn et al. | 326/87 |
| 2004/0150430 A1 * | 8/2004 | Li et al. | 327/65 |
| 2008/0042686 A1 * | 2/2008 | Otsuka et al. | 326/30 |

OTHER PUBLICATIONS

Quan et al.; A 1.0625-to-14.025Gb/s Multimedia Transceiver will Full-rate Source-Series-Terminated Transmit Driver and Floating-Tap Decision-Feedback Equializer in 40nm CMOS; ISSCC 2011 / Session 20 / High-Speed Transceivers & Building Blocks / 20.2; 2011 IEEE International Solid-State Circuits Conference; Feb. 23, 2011.
Dettloff et al.: A 32mW 7.4Gb/s Protocol-Agile Source-Series-Terminated Transmitter in 45nm CMOS SOI; IEEE International Solid-State Circuits Conference; Presentation; 2010; Rambus, Inc., Los Altos, CA.
Dettloff et al.; A 32mW 7.4Gb/s Protocol-Agile Source-Series-Terminated Transmitter in 45nm CMOS SOI; ISSCC 2010 / Session 20 / Next-Generation Optical & Electrical Interfaces / 20.6; 2010 IEEE International Solid-State Circuits Conference; Paper; Feb. 10, 2010; Rambus, Chapel Hill, NC; Rambus, Bangalore, India.
Kossel et al.; A T-Coil Enhanced 8.5Gb/s High-Swing Source-Series-Terminated Transmitter in 65nm Bulk CMOS; 2008 IEEE International Solid-State Circuits Conference; IBM Research GmbH; Presentation; 2008/ Zurich Research Laboratory, Rüschlikon, Switzerland.
Menolfi et al.; A 16Gb/s Source-Series Terminated Transmitter in 65nm CMOS SOI; ISSCC 2007 / Session 24 / Multi-Gb/s Transceivers / 24.6; 2007 IEEE International Solid-State Circuits Conference; Feb. 14, 2007; Paper; IBM, Rueschlikon, Switzerland.

(Continued)

*Primary Examiner* — Danny Nguyen

(57) ABSTRACT

A differential line driver with N-paralleled slices for driving an impedance-matched transmission line. Each driver slice is a modified H-bridge driver using low-voltage, high-speed transistors. By using a voltage-dropping first resistor in each slice, a high-voltage power supply that would normally damage the transistors can be used to power the driver and produce a differential output signal with peak-to-peak amplitudes that otherwise might not be possible. Each transistor in each driver slice has a resistor disposed between the transistor and the respective output node of the driver to enhance ESD protection of the transistors and, in combination with the first resistor, to impedance match the driver to the transmission line.

29 Claims, 6 Drawing Sheets

(56) References Cited

OTHER PUBLICATIONS

Menolfi et al.; A 16Gb/s Source-Series Terminated Transmitter in 65nm SOI; 2007 IEEE International Solid-State Circuits Conference; Presentation; 2007; IBM Research GmbH, Zurich Research Laboratory, Ruschlikon, Switzerland.

Kossel et al.; A T-Coil-Enhanced 8.5Gb/s High-Swing SST Transmitter in 65 nm Bulk CMOS With ? 16 dB Return Loss Over 10 GHz Bandwidth; IEEE Journal of Solid-State Circuits, vol. 43, No. 12, Dec. 2008.

Menolfi et al.; A 14Gb/s High-Swing Thin-Oxide Device SST TX in 45nm CMOS SOI; ISSCC 2011 / Session 8 / Architectures & Circuits for Next Generation Wireline Transceivers / 8.8; 2011 IEEE International Solid-State Circuits Conference; Paper; IBM Zurich Research Laboratory, Rueschlikon, Switzerland; Miromico, Zurich, Switzerland.

Menolfi et al.; A 14Gb/s High-Swing Thin-Oxide Device SST TX in 45nm CMOS SOI; ISSCC 2011 / Session 8 / Architectures & Circuits for Next Generation Wireline Transceivers / 8.8; 2011 IEEE International Solid-State Circuits Conference; Presentation; IBM Zurich Research Laboratory, Rueschlikon, Switzerland; Miromico, Zurich, Switzerland.

Kossel et al; A T-Coil-Enhanced 8.5 Gb/s High-Swing Source-Series-Terminated Transmitter in 65nm Bulk CMOS; ISSCC 2008 / Session 5 / High-Speed Transceivers / 5.7; Digest of Technical Papers; Feb. 4, 2008; IBM Zurich Research Laboratory, Rüschlikon, Switzerland.

\* cited by examiner

100

228

HIGH-SWING DIFFERENTIAL DRIVER USING LOW-VOLTAGE TRANSISTORS

BACKGROUND

Multi-gigabit per second (Gbps) communication between various chips on a circuit board or modules on a backplane has been in use for quite a while. Data transmission is usually from a transmitter that serializes parallel data for transmission over a communication media, such as twisted pair conductors as a cable or embedded in a backplane, fiber optic cable, or coaxial cable(s), to a receiver that recovers the transmitted data and deserializes the data into parallel form. However, data transmission greater than 10 Gbps over communication paths longer than a few centimeters has been difficult to achieve because various signal impairments, such as intersymbol interference (ISI), crosstalk, echo, and other noise, can corrupt the received data signal to such an extent that a receiver unable to recover the transmitted data at the desired high data rate with an acceptable level of error performance.

Various techniques are employed to improve the performance of the receiver. One technique is to provide the receiver with an analog front end (AFE) having linear and decision feedback equalizers to compensate for high, frequency-dependent insertion losses of the media. Even though the shape of the received signal is improved by the AFE, the signal-to-noise ratio (SNR) of the received signal might not be high enough for acceptably low error rate detection because the received signal is subject to noise that the AFE cannot fully correct.

One way to improve the SNR of the received signal is for the transmitter to drive the media with signals of sufficient amplitude that the received signal has sufficient amplitude relative to the amplitude of the noise on the received signal such that the receiver properly recovers the transmitted data from the received signal. Correspondingly, the transmitter can send the data in a way that simply reduces the amount of noise on the signal as received by the receiver. Through the use of shielding the media and by using differential signaling over balanced media such as shielded twisted pair, the media itself is less susceptible to interference, resulting in lower noise in the received signal and, consequently, a higher SNR in the signal presented to the receiver.

As transmission data rates increase, the speed (bandwidth) of the transistors used in the transmitter must also increase. For a given CMOS technology, thin-oxide transistors offer higher speed than thick-oxide transistors. Concomitant with the increase in speed, the voltage level handling capability of transistors decreases. It is well known that the maximum achievable peak-to-peak output swing of a differential voltage mode driver is limited to the power supply voltage utilized by the driver under impedance-matched conditions. Operating the transistors at voltage levels needed to deliver high-amplitude output signals can overstress the transistors, causing them to fail. Thus, a transmitter requiring higher speed transistors to transmit signals at a desired data rate without damaging the transistors might result in the signal presented to the receiver having an SNR insufficient for acceptably low error rate communication.

Therefore, it is desirable to provide a transmitter capable of utilizing high-speed transistors to transmit data at high data rates and also capable of producing output signals of sufficient amplitude for reliable communication at the high data rates without overstressing the transistors.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

In one embodiment of the invention, a differential line driver has an input node, differential output nodes for coupling to a transmission line with a characteristic impedance $Z_0$, and N driver slices. At least one of the driver slices has first and second power nodes for coupling to a power supply, a first common node, an impedance device having a resistance and coupled between the first power node and the first common node, first and second transistors of a first conductivity type, a first resistor, a second resistor, and first and second electrostatic discharge (ESD) protectors coupled to at least one of the power nodes and the respective first and second ones of the differential output nodes. The first and second transistors each have a first output terminal coupled to the first common node, a second output terminal, and a control terminal, the control terminals of the first and second transistors coupling to the input node. The first resistor is coupled between the second output terminal of the first transistor and a first one of the differential output nodes, the second resistor is coupled between the second output terminal of the second transistor and a second one of the differential output nodes. The first and second transistors each have a first output terminal coupled to the first common node, a second output terminal, and a control terminal, the control terminals of the first and second transistors coupling to respective ones of the differential input nodes. The first and second resistors have substantially the same resistance value, and a sum of the resistances of the impedance device and first resistor is approximately equal to $N\,Z_0$ ohms, where N is an integer greater than or equal to one.

BRIEF DESCRIPTION OF THE DRAWINGS

Aspects and features of embodiments of the invention will become more fully apparent from the following detailed description, the appended claims, and the accompanying drawings in which like reference numerals identify similar or identical elements.

DETAILED DESCRIPTION

As data rates increase for serializer/deserializer (SERDES) applications, the channel quality degrades. One technique typically used to achieve the bit error rate (BER) performance needed for reliable communications over the degraded channel is to increase the amplitude of the transmitted signal to increase the signal-to-noise ratio (SNR) of the signal presented to the receiver. However, as discussed above, there is generally an inverse relationship between the breakdown voltage and the speed of the transistors used to drive signals onto the communication channel: the higher the speed, the lower the gate-to-source breakdown voltage since faster transistors have a thinner gate insulating layer than higher voltage, but slower, transistors. Where very high-speed communications is desired, the breakdown voltage of the transistors with the desired speed might be too low for the desired amplitude of the signals being transmitted. Thus, a new driver design is desired that can incorporate the high-speed, low breakdown voltage transistors required for high-speed signaling applications such as 10 Gbps and faster SERDES applications.

Figure 1:
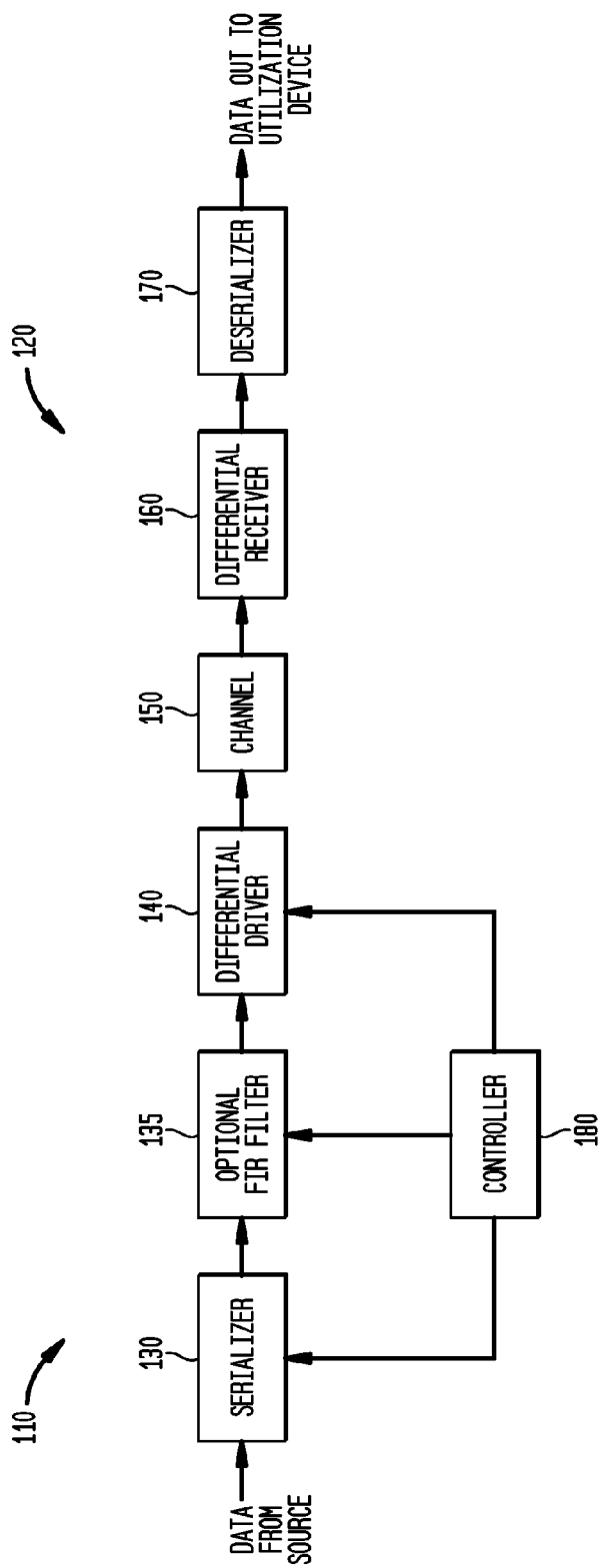
FIG. 1 is a simplified block diagram of a serializer/deserializer (SERDES) communication channel having a differential driver.

FIG. 1 is a block diagram of a typical SERDES communication system 100 that incorporates differential signaling in between a transmitter portion 110 and a receiver portion 120 in the system 100. As shown in FIG. 1, data from a source, such as a computer, disk drive, logic in a field-programmable gate array (FPGA) or other source of data, is serialized by serializer 130, through an optional FIR filter 135 signal processing stage, and transmitted by differential driver 140 through a channel 150 with characteristic impedance $Z_0$ ohms (e.g., a backplane, metal traces in a substrate, a cable, or a combination thereof) to a differential receiver 160. The differential receiver 160 typically contains circuitry that filters and slices the received data stream as well as extracting a clock signal from the received data stream. The differential receiver 160 might also contain both analog and digital equalizers to counteract distortions introduced by the channel 150, such as intersymbol interference, to improve the BER of the receiver; see, for example, U.S. Pat. No. 7,599,461 incorporated by reference herein in its entirety. A deserializer 170 takes the received data and deserializes the data back into a format that is presented to a utilization device, such as a computer, disk drive, or a high-speed logic within an FPGA. As will be explained in more detail below, the data from serializer 130 is optionally equalized or filtered through a transmit FIR filter 135 between the serializer 130 the driver 140 to improve the BER performance of the system 100 by pre-distorting the signals applied to the conductors in the channel 150. It is understood that the FIR function of the transmitter can be moved from the transmitter to the receiver and incorporated into the receiver's analog front end (AFE). In addition to the serializer 130, optional FIR filter 135, and driver 140, the transmitter portion 110 of the channel 100 includes a controller 180, such as control logic with possible analog signal handling capability, is also provided that controls the operation of the serializer 130 and driver 140 as will be explained in more detail below.

Figure 2:
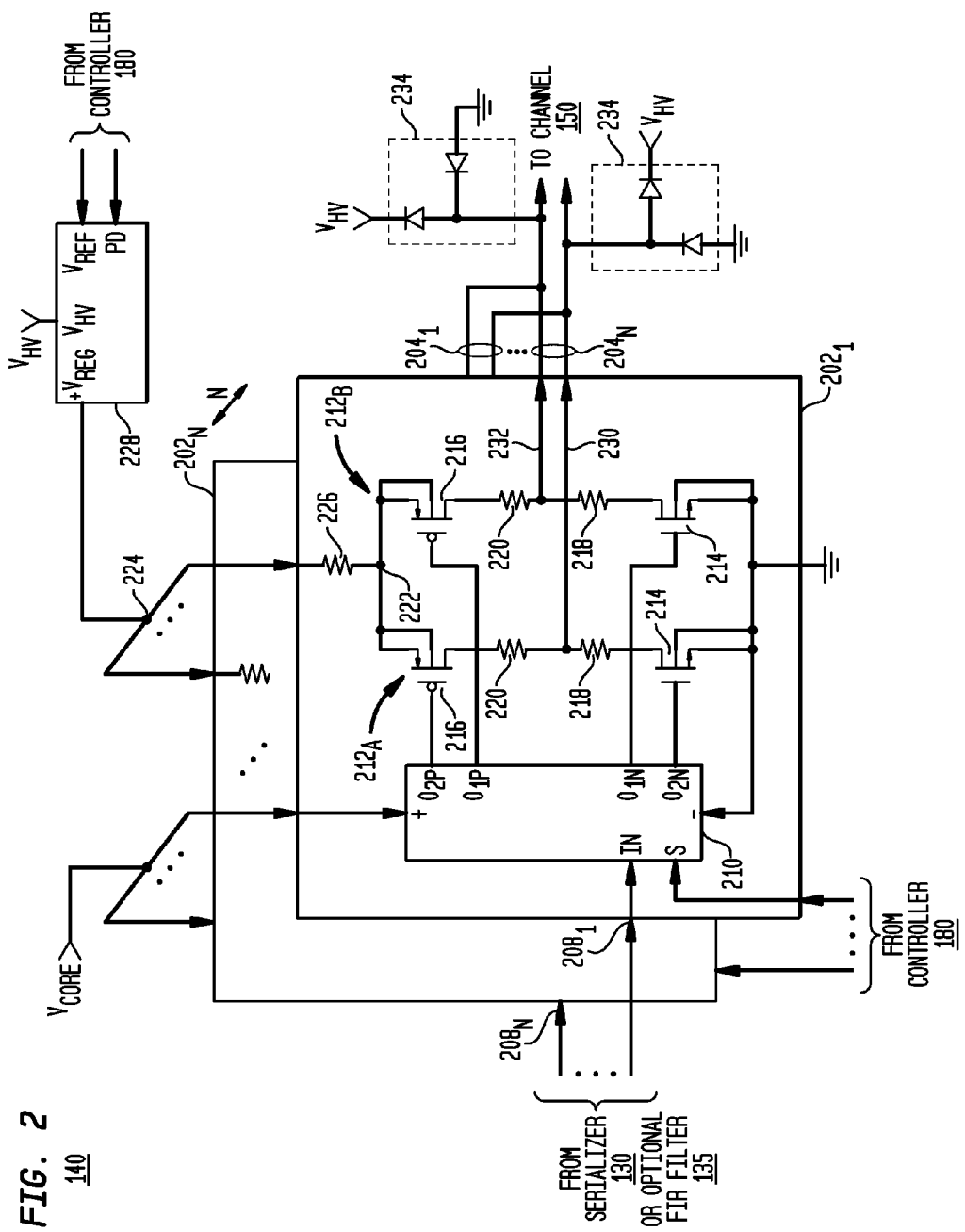
FIG. 2 is a simplified schematic diagram of an implementation of the differential driver shown in FIG. 1 according to one embodiment of the invention.

FIG. 2 diagrams the details of an exemplary differential driver according to one embodiment of the invention. In this embodiment, the driver 140 has N paralleled slices $202_1$-$202_N$, where N is an integer $\geq 1$. Differential outputs $204_1$-$204_N$ of the slices are paralleled so as to provide an output impedance that approximately matches the characteristic impedance of the conductors in the channel 150, e.g., 50 or 100 ohms ($\Omega$), as will be explained in more detail below. In this embodiment, the optional FIR filter 135 (FIG. 1) drives the inputs $208_1$-$208_N$ of the slices to drive selected ones of the slices in accordance with time-delayed versions of serialized data from the serializer 130 (FIG. 1), providing pre-distortion to the differential output signals presented to conductors in the channel 150. FIR filters are known in the art, such as that disclosed in "A 1.0625-to-14.025 Gb/s Multimedia Transceiver with Full-rate Source-Series-Terminated Transmit Driver and Floating-Tap Decision-Feedback Equalizer in 40 nm CMOS" by Quan et al., Proceedings of the 2011 IEEE International Solid-State Circuits Conference, pp 348-349, incorporated by reference herein in its entirety.

Figure 4:
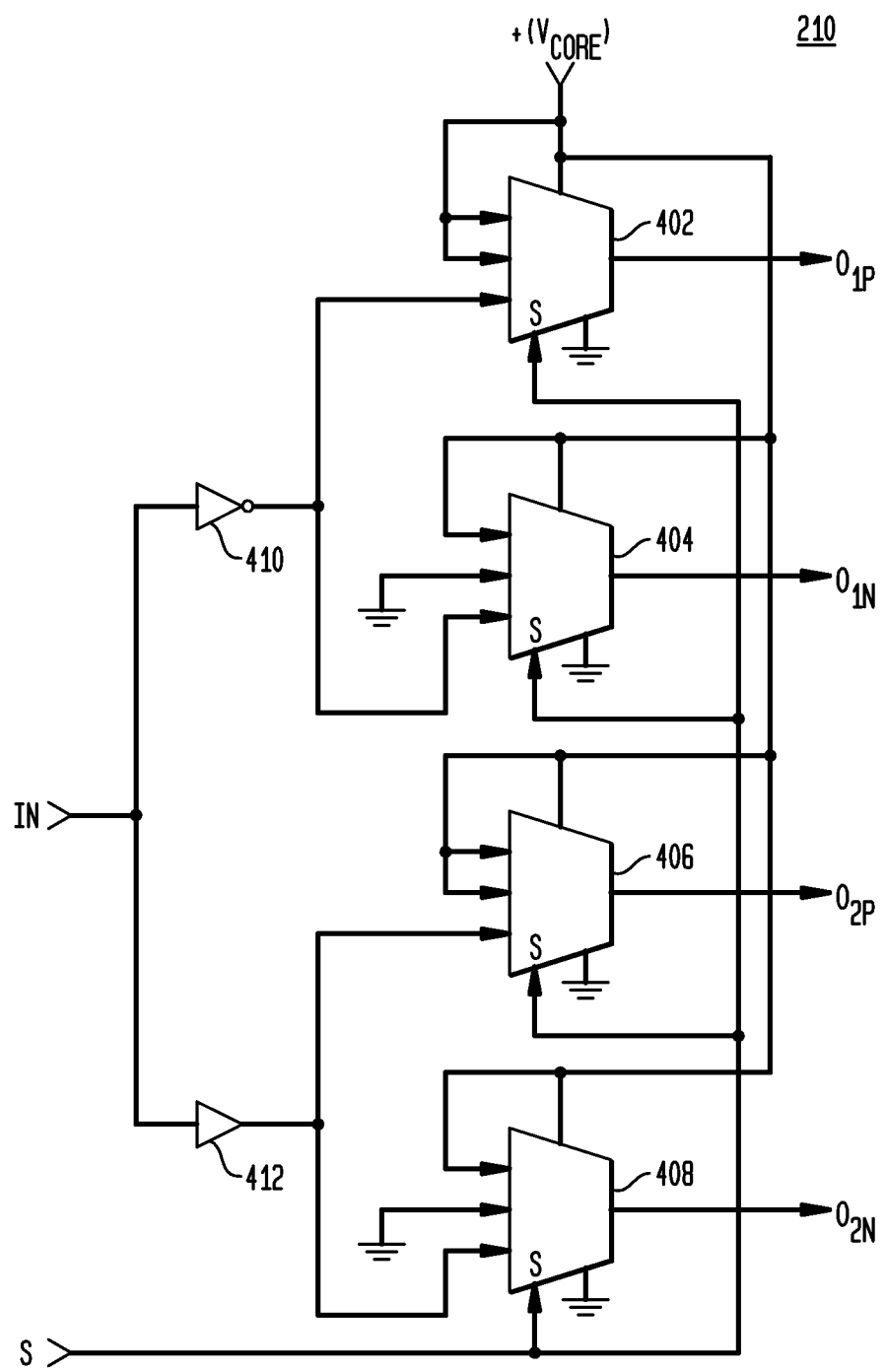
FIG. 4 is a simplified block diagram of a pre-driver used in the differential driver shown in FIG. 2.

Each slice $202_1$-$202_N$ has a pre-driver circuit 210 that receives on input IN an input signal from either the serializer 130 (FIG. 1) or the optional FIR filter 135 and, under the control of controller 180 as will be explained in more detail below in connection with FIG. 4, provides output signals $O_{1P}$, $O_{1N}$, and $O_{2P}$, $O_{2N}$ of half-drivers $212_A$, $212_B$ which together form a modified H-bridge driver. The output signals $O_{1P}$, $O_{1N}$, and $O_{2P}$, $O_{2N}$ from the pre-driver 210 will be described in more detail below in connection with FIG. 4, have a voltage swing from approximately ground or $V_{SS}$ (substantially zero volts) to approximately $V_{CORE}$, the voltage used power logic of, for example, the serializer 130 and the FIR filter 206. When the driver 140 is driving data signals onto the channel 150, the outputs $O_{1N}$, $O_{2N}$ are complementary and $O_{2N}$ has the same polarity as $O_{2P}$; similarly, $O_{1P}$, $O_{2P}$ are complementary and $O_{1N}$ has the same polarity as $O_{1P}$. Each half-driver $212_A$, $212_B$ has an nMOS transistor 214 and a pMOS transistor 216, the gates of which are driven by the respective output signal from the pre-driver 210. For each half-driver, the drain terminals of each transistor are coupled together via resistors 218 and 220. The junction of resistors 218 and 220 in each half-driver form a respective one of the differential outputs $204_1$-$204_N$ of the respective slice $202_1$-$202_N$. The values of the resistors 218, 220 will be explained in detail below. The transistors 214, 216 may be high-speed (high-bandwidth) devices similar to transistors used in the pre-driver 210, the serializer 130, the FIR filter 135, and other high-speed circuitry typically powered from the relatively low-voltage power supply $V_{CORE}$. Because the high-speed transistors have a low gate-to-substrate breakdown voltage as discussed above, the maximum power supply (e.g., $V_{CORE}$) voltage for circuitry utilizing the high-speed transistors is relatively low, e.g., 0.9 volts for transistors in 45 nm CMOS technology. This maximum power supply voltage is too low for an output driver powered from $V_{CORE}$ to produce differential signals having differential peak-to-peak amplitude of, for example, 0.9 volts or more while presenting an output impedance substantially equal to the characteristic impedance of the conductors in the channel 150.

Figure 3:
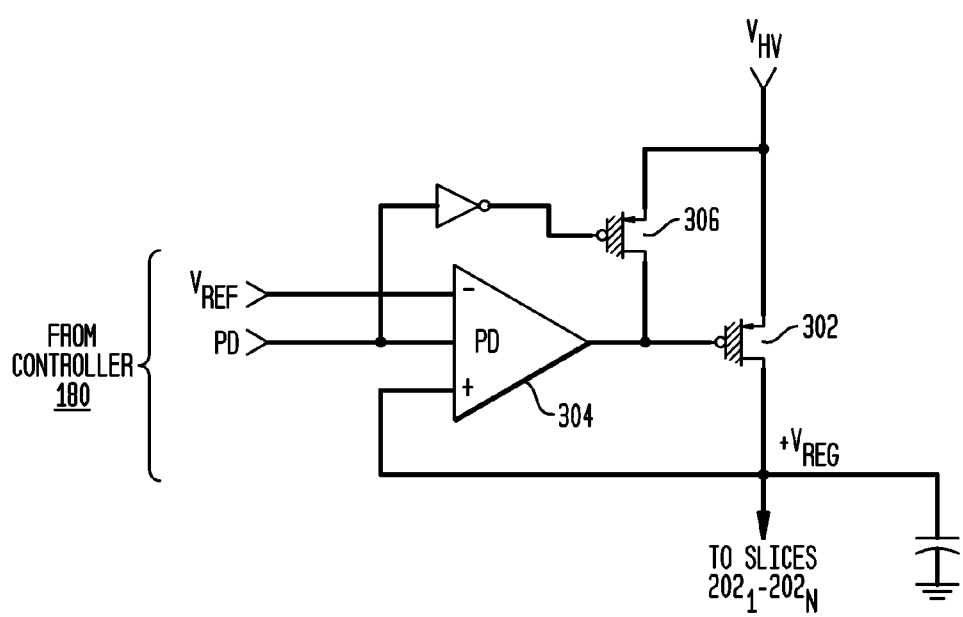
FIG. 3 is a simplified schematic diagram of a voltage regulator used in conjunction with the differential driver shown in FIG. 2.

While the source terminals of the nMOS transistors 214 are connected to ground in this embodiment, the source terminals of the pMOS transistors 216 are connected together at node 222 and are coupled to a power supply node 224 via resistor 226. In addition, the N-well or tub the pMOS transistors 216 are formed in is also connected to node 222. The power supply node 224 optionally receives a regulated voltage from optional voltage regulator 228 that, as will be explained in more detail in connection with FIG. 3, provides from a higher-voltage power supply input ($V_{TH}$) a regulated output voltage +$V_{REG}$ that is controlled by controller 180 and has a higher voltage than that of the power supply $V_{CORE}$. Generally, the voltage of +$V_{REG}$ is greater than the transistors 214, 216 can otherwise tolerate. For example, a voltage of 1.1 to 1.5 volts may be needed for adequate amplitude differential output signal, but too high a voltage to power conventional drivers using the above-mentioned high-speed transistors, as will be discussed in more detail below. Node 224 may be connected directly to a power supply without the use of the regulator 228 on the same chip as the driver 140.

While the polarities of the transistors are described as pMOS or nMOS, the polarities of the transistors may be interchanged with a concomitant reversal of power supply polarities. Also, all pMOS or all nMOS transistors can be used in the driver with the differential input signals routed to the appropriate transistors so that only one transistor at a time is conducting in each half-bridge $212_A$, $212_B$. Further, bipolar transistors may be substituted for the MOS transistors, e.g., PNP transistors for pMOS transistors and NPN transistors for nMOS transistors.

Operation of each slice $202_1$-$202_N$ in the driver 140 is as follows. Assuming the outputs $O_{1N}$ and $O_{1P}$ from the pre-driver 210 are approximately equal to $V_{CORE}$ and the outputs $O_{2N}$ and $O_{2P}$ are approximately equal to ground, then transistor 216 in half-driver $212_A$ is conducting and transistor 214 in half-driver $212_B$ is conducting, the remaining transistors substantially non-conducting. Thus, current flows through resistor 226, transistor 216 and resistor 220 in half-driver $212_A$, out to channel (e.g., a transmission line) conductors 150 on conductor 230, back from the conductors in the channel 150 on conductor 232 through resistor 218 and transistor 214 in half-driver $212_B$. Conversely, assuming the outputs $O_{1N}$ and $O_{1P}$ from the pre-driver 210 are approximately equal to ground and the outputs $O_{2N}$ and $O_{2P}$ are approximately equal to $V_{CORE}$, then transistor 216 in half-driver $212_B$ is conducting and transistor 214 in half-driver $212_A$ is conducting, the remaining transistors substantially not conducting. Thus, current flows through resistor 226, transistor 216 and resistor 220 in half-driver $212_B$, out to conductors in the channel 150 on conductors 232, back from the conductors in the channel 150 on conductor 230 through resistor 218 and transistor 214 in half-driver $212_A$. Except for a brief, transitory period of time when the transistors 214 and 216 in the half-drivers may both be conducting or both may not be conducting, only one transistor in each half-driver is on at any one time. Thus, the direction of current flow along the conductors 230, 232 is in accordance with the differential input signal applied to inputs IN of the pre-driver 210. Because the outputs of the N slices $202_1$-$202_N$ are in parallel, the voltage of the differential signal applied to the conductors in the channel 150 may be a determined, for a given impedance of communication conductors 150, by the resistance of the resistors 218, 220, and 226 and the voltage on the node 224, and the algebraic of current flowing on the conductors 230, 232 in each of the slices. For example, current on the conductors 230, 232 in some of the slices in may be opposite that of conductors 230, 232 in the other slices, referred to here as slices being in opposite phase to the other slices, reducing the output voltage of the differential signal in comparison to what the output voltage would be with all of the slices operating with the same phase. Therefore, the voltage of the differential output signal may be adjusted by changing the ratio of the number of slices operating with one phase to the number of slices operating with the opposite phase. The single-ended output impedance of the driver 140 as presented to the conductors in the channel 150 is substantially equal to 1/N of the resistor 218, or equivalently, of the sum of the resistances of resistors 220 and 226, and is substantially independent of the phase the slices $202_1$-$202_N$ are operating, assuming each slice $202_1$-$202_N$ is substantially the same.

For a driver 140 with a single slice, e.g. $202_1$ (N=1), resistances of the resistors 218, 220, and 226 may be determined as follows. For purposes here, the conductors in the channel 150 form a transmission line having a differential characteristic impedance of $Z_0$, such as 100Ω, resistor 218 ($R_{218}$) and the sum of the resistances of resistors 226 ($R_{226}$) and resistor 220 ($R_{220}$), is approximately equal to one-half of $Z_0$ ($R_{226}$+$R_{220}$=$R_{218}$=$Z_0$/2), ignoring the on resistances of the transistors 214, 216. It is also desirable for the voltage on node 222 to be approximately equal to the voltage of the core power supply voltage source $V_{CORE}$ so that transistors 216 are not subject to gate-to-substrate voltages that might damage the transistors 216. By knowing the magnitude of the current flowing in and out of the channel 150 from the driver 140, the portion of the current passing through resistor 226 (all in case of N=1), the resistance of resistor 226 is determined by dividing the amount of voltage needed to reduce the supply voltage on node 224 to approximately $V_{CORE}$ by the current flowing through resistor 226. Resistors 218 are used, in conjunction with electrostatic discharge (ESD) protection devices 234, to provide enhanced ESD protection for transistors 216 compared to the level of ESD protection from ESD protectors 234 alone. To provide the enhanced ESD protection, the resistance of the resistors 218 is typically 5Ω or more but may be less than 5Ω depending on the size of the transistors 216. For the cases when N>1, the ESD protection resistor $R_{220}$ becomes significant. For example, when N=70, $R_{220}$ 70 5Ω=350Ω and provides significant ESD protection for transistor 216. Each of the ESD protectors 234 in this embodiment are conventional, such as two diodes series-connected between the most positive and negative power supplies, here the positive power supply node ($V_{HV}$ as described in connection with FIG. 3) and ground or $V_{SS}$. A node in common with both diodes in each ESD protector 234 is connected to the respective output conductor 230, 232. Other ESD protectors may be used as well, such as diode-connected MOS transistors. If no regulator 228 is used, then the ESD protectors are connected to the power supply connected to node 224.

To take into consideration the on-resistances of the transistors 214, 216, the calculated resistance values of the resistors 218, 220 may be reduced by on-resistance of the transistors 214, 216. For example, if the on-resistance of transistor 214 is 10Ω, the resistance of resistors 218 may be reduced by 10Ω. Similarly, if the on-resistance of transistor 216 is 20Ω, the resistance of resistors 220 may be reduced by 20Ω. The resistance of resistor 226 is not adjusted.

For instantiations of the driver 140 with more than one slice, the resistances of the resistors 218, 220, and 226 are scaled-up by the number of slices. For example, if the resistance of resistor 218 is determined to be 50Ω and there are N slices, then the resistance of the resistor 218 in each slice $202_1$-$202_N$ is 50 N ohms.

The voltage on node 224 may be calculated depending upon how the termination of the conductors in the channel 150 by the receiver 160 (FIG. 1) and the voltage on node 222 ($V_{222}$). For purposes of this calculation, $V_{222}$=$V_{CORE}$. For embodiments where the channel 150 is terminated with a matched load that is "floating", i.e., not connected to ground or another power source, the voltage on node 224 is set approximately to $(4V_{222}R_{218})/(4R_{218}-R_{226})$. For embodiments where the channel 150 is terminated with a matched load that is not floating (connected to a voltage supply, e.g., ground in DC-coupled mode or ground, power supply or a reference voltage in AC-coupled mode), the voltage on node 224 is set approximately to $(2V_{222}R_{218})/(2R_{218}-R_{226})$.

Example

With an exemplary 100Ω floating differential characteristic impedance of the conductors in the channel 150 and a single-slice driver 140, then the following exemplary resistance values may be used in a driver with transistors 216 having a breakdown voltage of 0.9 volts, and power supply voltage +$V_{REG}$ of 1.1 volts to provide a differential output signal with a 1.1 volt peak-to-peak differential voltage, ignoring the on-resistances of the transistors:

$R_{218}$=50Ω

$R_{220}$=10Ω

$R_{226}$=40Ω

If the driver has 70 slices (N=70), then:

$R_{218}=3500\Omega$ $R_{220}=700\Omega$ $R_{226}=2800\Omega$

Taking the on-resistances of the transistors 214, 216 of an exemplary 100Ω in each of the slices $202_1$-$202_N$ into consideration, then:

$R_{218}=3400\Omega$ $R_{220}=600\Omega$ $R_{226}=2800\Omega$

For a channel 150 terminated with 50Ω single ended, 100Ω differential load to a fixed voltage, voltage on node $V_{222}$ of 0.9 volts and using the above-calculated resistances for resistor 218 and resistor 220, the voltage on node 224 (+$V_{REG}$) is calculated to be approximately 1.5 volts, and provides a differential output signal with a 1.5 volt peak-to-peak differential voltage.

End Example

FIG. 3 illustrates an exemplary embodiment of the optional voltage regulator 228 in FIG. 2. In this embodiment, the regulator 228 is a conventional low-drop-out (LDO) regulator using a pMOS pass-transistor 302 in conjunction with an amplifier 304 to step-down a high voltage input power supply voltage $V_{HV}$ so that the voltage on output +$V_{REG}$ is substantially equal to reference input voltage $V_{REF}$ from controller 180. The regulator 228 may also be shut down or disabled by controller 180 by asserting a logical one on input PD, disabling amplifier 304 and turning on transistor 306 to assure that transistor 302 is fully turned-off. Both transistors 302 and 306, and possibly all of the transistors in amplifier 304, have thick gate oxides to that they can tolerate the higher voltages used by the regulator. The voltage of $V_{HV}$ is at least equal to the desired voltage of +$V_{REG}$ and may be considerably higher, e.g., 2.5 or 1.8 volts.

FIG. 4 illustrates an exemplary embodiment of the pre-driver 210 in each slice $202_1$-$202_N$ in FIG. 2. Four multiplexers 402-408 are powered from $V_{CORE}$ and pass inverted data and non-inverted data signals applied to input IN via inverter 410 and buffer 412 to corresponding outputs $O_{1P}$, $O_{1N}$, $O_{2P}$, $O_{2N}$ during normal operation. However, if series capacitors (not shown) are used between the driver 140 and the receiver 160 (FIG. 1), prior to normal data transmissions, a "reset" may be required to occasionally equalize the voltage across the capacitors. To do so, the controller 180 reconfigures the multiplexers 402, 404 to pass to outputs $O_{1P}$, $O_{1N}$, and $O_{2P}$, $O_{2N}$ a logical one ($V_{CORE}$) (or logical zero, as desired) so that the driver 140 produces the same voltage on both output conductors 230, 232 in each slice $202_1$-$202_N$ (FIG. 2), substantially equal to ground in this example. The multiplexers may also be configured by controller 180 to force all the transistors 214, 216 (FIG. 2) to be non-conductive, putting the driver 140 in a high-impedance ("Hi-Z") output state with or without removing the power supply voltage on node 224 (FIG. 2), as desired. The gates of transistors 214 (nMOS), 216 (pMOS) are driven with a low logic signal ($V_{SS}$) and a high logic signal ($V_{CORE}$), respectively, from appropriately configured multiplexers 402-408 to force the transistors to be substantially non-conductive.

Figure 5:
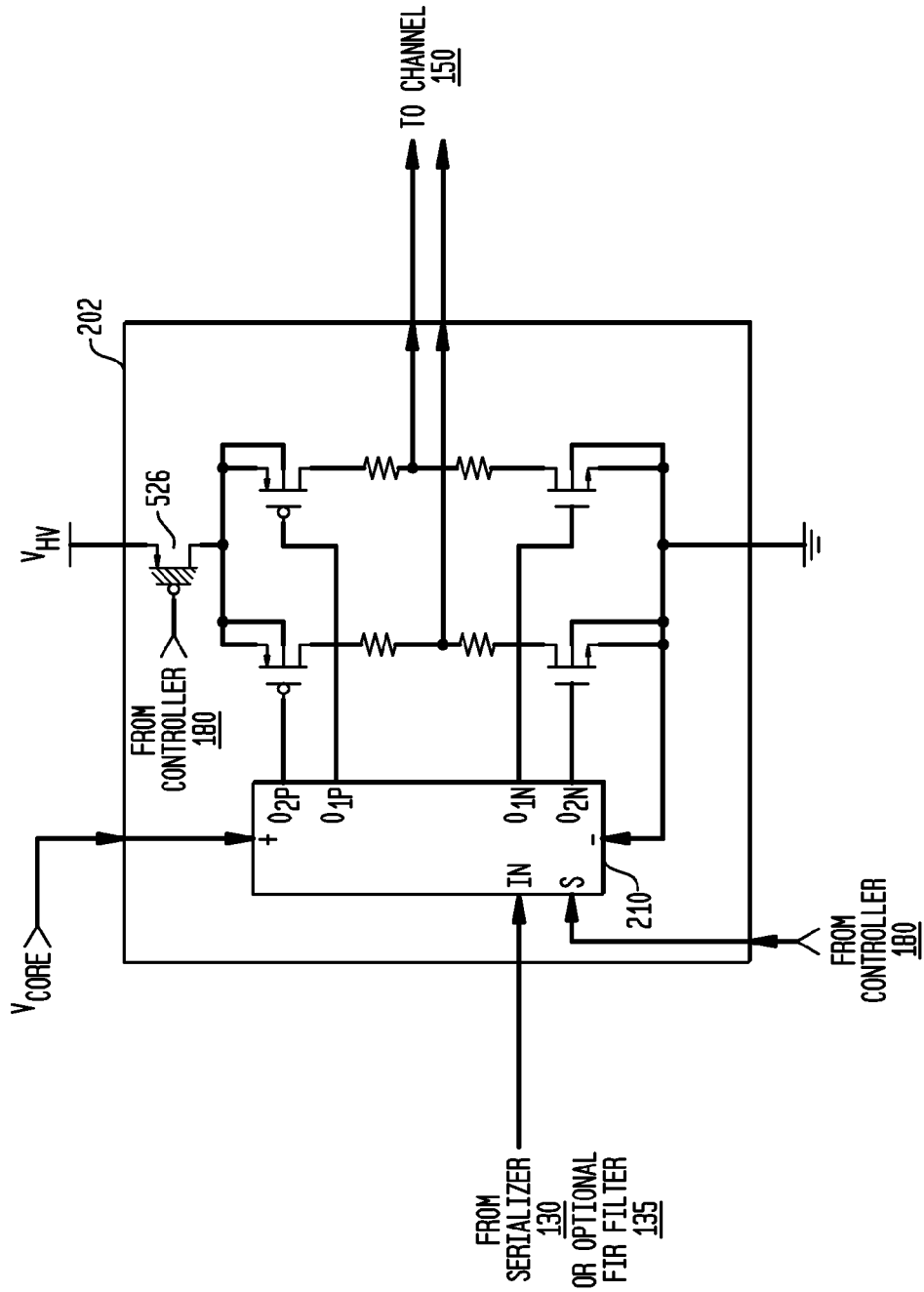
FIG. 5 is a simplified schematic diagram of another implementation of a differential driver shown in FIG. 1 according to another embodiment of the invention.

FIG. 5 illustrates another embodiment of the slices $202_1$-$202_N$. A representative slice 202 is substantially the same as the slices shown in FIG. 2 but instead of a discrete resistor 226, a transistor 526 sized to have the same desired resistance as resistor 226, as described above. Advantageously, transistors 526 in each slice 202 are controlled by the controller 180 to selectively disable one or more of the N slices for powering-down the driver as well as allowing for a more exact matching of the N-slice driver to the characteristic impedance of the conductors in channel 150 because the exact number of slices can be enabled to take into consideration manufacturing process, operating temperature, and supply voltage effects on the transistors 214, 216 and resistors 218, 220, 226 as well as providing the flexibility to match different channel characteristic impedances, e.g., 50Ω, 75Ω, 100Ω, etc. An exemplary technique to control the transistors 526 is disclosed in U.S. Pat. No. 5,243,229 incorporated by reference herein in its entirety.

Because the transistors 526 are thick-oxide devices that can withstand higher gate-to-substrate voltages than the thin-oxide devices such as transistors 214, 216, the driver in slices 202 are powered directly from the high voltage power supply $V_{HV}$ voltage described above. Alternatively, a voltage regulator such as that shown in FIG. 3 may be interposed between transistors 526 and the supply voltage $V_{HV}$ to step-down the voltage of $V_{HV}$ to a lower voltage for coupling to the transistors 526.

Figure 6:
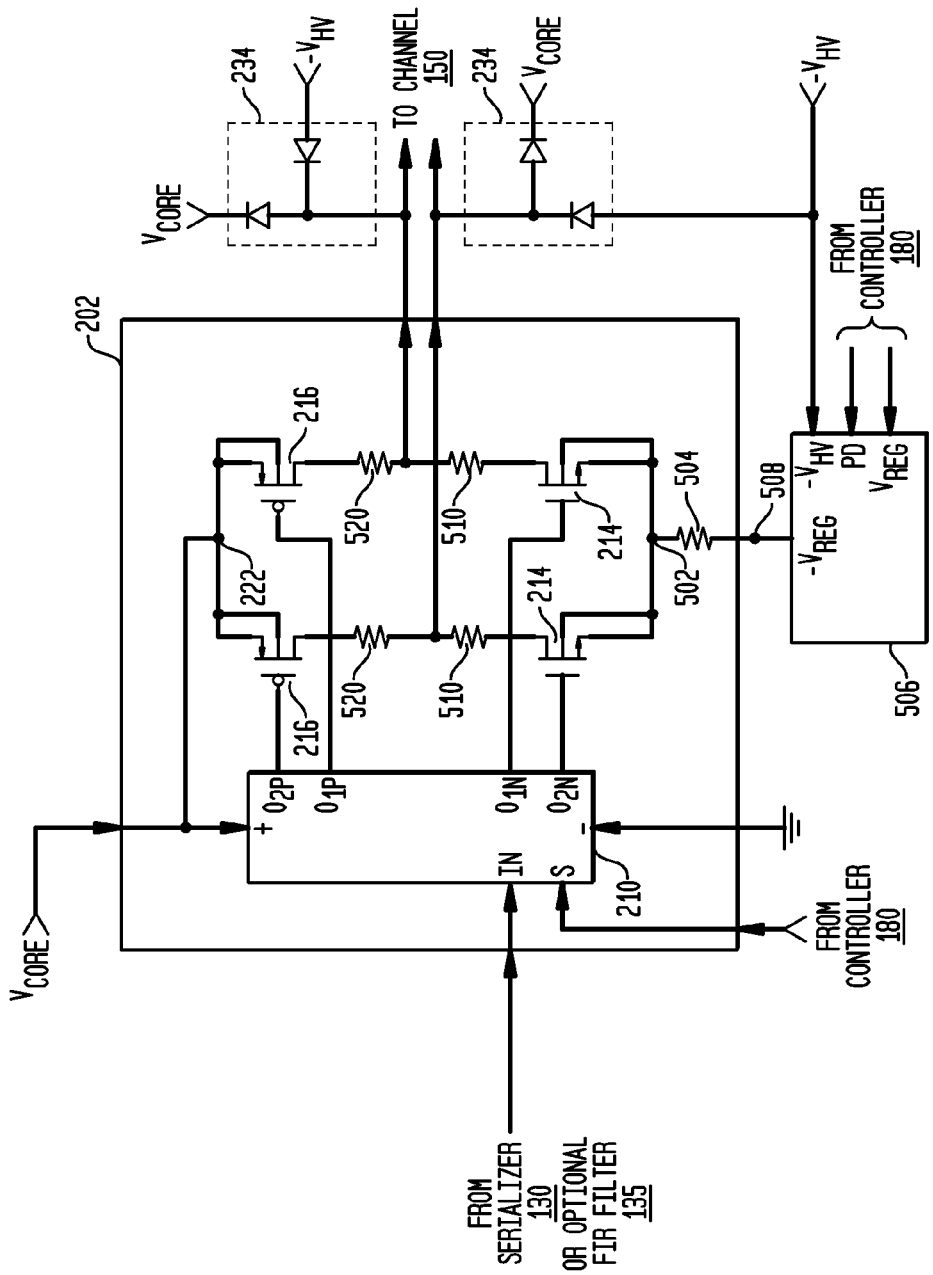
FIG. 6 is a simplified schematic diagram of another implementation of a differential driver shown in FIG. 1 according to another embodiment of the invention.

FIG. 6 illustrates another embodiment of the slices $202_1$-$202_N$ in the driver 140 (FIG. 2). A representative slice 202 is substantially the same as the slices shown in FIG. 2 but resistor 226 is removed and node 222 is coupled to $V_{CORE}$ and instead of the sources of transistors 214 connecting to ground as in FIG. 2, the sources of transistors 214 are connected together at node 502 and, via resistor 504, coupled to a negative voltage supply –$V_{REG}$ on node 508 from voltage regulator 506. Here, the P-well or tub the nMOS transistors 214 are formed in is also connected to node 502. Other slices 202 (not shown) in this embodiment of the driver 140 are also coupled to node 508. The resistances of resistors 520 in this embodiment are calculated as described above for resistors 218. In the case where only one slice 202 is used (N=1), the resistances of the resistors 504 and 510 may be determined as follows. For purposes here, the conductors in channel 150 form a transmission line having a characteristic differential impedance of $Z_0$, and the sum of the resistances of resistor 504 ($R_{504}$), and resistor 510 ($R_{510}$) is approximately equal to one-half $Z_0$ ($R_{504}$+$R_{510}$=$Z_0$/2), ignoring the on resistances of the transistors 214, 216. It is desirable but not essential that $R_{520}$=$R_{504}$+$R_{510}$. It is also desirable for the voltage on node 502 to be approximately equal to ground or another voltage approximately equal to the voltage of the most negative power supply for pre-driver 210 such that the voltage difference between that voltage and the voltage on node 502 is sufficiently small so that transistors 214 are not subject to gate-to-substrate voltages that might damage the transistors 214. By knowing the magnitude of the current flowing in and out of the channel 150 from the driver 140, the portion of the current passing through resistor 504 (all in case of N=1), the resistance of resistor 504 is determined by dividing the amount of voltage needed to reduce the supply voltage on node 508 to approximately zero (ground) by the current flowing through resistor 504. Resistors 510, like resistors 220, are used, in conjunction with electrostatic discharge (ESD) protection devices 234, to provide enhanced ESD protection for transistors 214 compared to the level of ESD protection from ESD protectors 234 alone. To provide the enhanced ESD protection, the resistance of the resistors 510 is typically 5Ω or more but may be less than 5Ω depending on the size of the transistors 214. The ESD protectors are conventional, as described above, but are connected between the most negative voltage supply voltage, here $-V_{HV}$, and the most positive supply voltage, $V_{CORE}$.

In one embodiment, the regulator 506 is similar to the regulator 228 shown in FIG. 3 but configured to regulate a negative voltage under control of the controller 180. Other well-known regulator designs can also be used. The voltage on node 508 from the regulator may be calculated as described above regarding the voltage from regulator 228.

For instantiations of the driver with more than one slice, the resistances of the resistors 504 and 510 are scaled-up by the number of slices as described above. For example, if the resistance of resistor 504 is determined to be 40Ω and there are N slices, then the resistance of the resistor 504 in each slice of the N slices is 40 N ohms. Similarly, the on-resistances of the transistors 214 may be taken into account by reducing the resistances of resistors 510 by the on-resistances of the transistors 214 as described above.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A differential line driver having an input node, differential output nodes for coupling to a transmission line with a characteristic impedance $Z_0$, and N driver slices, at least one of the driver slices comprising:
   first and second power nodes for coupling to a power supply;
   a first common node;
   an impedance device having a resistance and coupled between the first power node and the first common node;
   first and second transistors of a first conductivity type, each transistor having a first output terminal coupled to the first common node, a second output terminal, and a control terminal, the control terminals of the first and second transistors coupling to the input node;
   a first resistor coupled between the second output terminal of the first transistor and a first one of the differential output nodes;
   a second resistor coupled between the second output terminal of the second transistor and a second one of the differential output nodes; and
   first and second ESD protectors coupled between at least one of the power nodes and the respective first and second ones of the differential output nodes;
   wherein the first and second resistors have substantially the same resistance value, and a sum of the resistances of the impedance device and first resistor is approximately equal to N $Z_0$ ohms, where N is an integer greater than or equal to one.

2. The differential line driver of claim 1 further comprising a pre-driver for each driver slice, each pre-driver responsive to the input node and coupled to the control terminals of the first and second transistors, the second power node, and to a third power node, the third node adapted to have a voltage thereon between voltages on the first and second nodes.

3. The differential line driver of claim 2 wherein the voltage of the first node is chosen to have a voltage on the first node to be approximately equal to the voltage of the third node.

4. The differential line driver of claim 2 wherein each of the pre-drivers is adapted to force the driver slices to simultaneously produce a voltage on the first and second differential output nodes substantially equal to a voltage on the second supply node.

5. The differential line driver of claim 2 wherein the first power node is adapted for coupling to a power supply having a first positive voltage, the third power node is adapted for coupling to a power supply having a second positive voltage less than the first positive voltage, and the second power node is adapted for coupling to ground.

6. The differential line driver of claim 2, wherein each of the pre-drivers is adapted to force the driver slices into a high output impedance state.

7. The differential line driver of claim 1 wherein the first and second resistors are sized to provide, along with the first and second ESD protectors, ESD protection for the first and second transistors, respectively.

8. The differential line driver of claim 6 wherein each ESD protector has at least a first and a second diode, the first diode connected between the respective differential output node and the first power node, and the second diode connected between the respective differential output node and the second power node.

9. The differential line driver of claim 8 wherein the first and second resistors have a resistance greater than approximately one-tenth of (N $Z_0$) ohms.

10. The differential line driver of claim 1 wherein the first and second transistors are pMOS devices and, for each of the transistors, the first output terminal is a source terminal, the second output terminal is a drain terminal, and the control terminal is a gate terminal.

11. The differential line driver of claim 1 further comprising:
   third and fourth transistors of a second conductivity type different from the first conductivity type, each transistor having a first output terminal coupled to the second power node, a second output terminal, and a control terminal, the control terminals of the third and fourth transistors coupling to the input node;

a third resistor coupled between the second output terminal of the third transistor and a first one of the differential output nodes; and a fourth resistor coupled between the second output terminal of the fourth transistor and a second one of the differential output nodes;

wherein the third and fourth resistors each have substantially the same resistance value approximately equal to N $Z_0$ ohms.

12. The differential line driver of claim 11 wherein the transistors of the first conductivity type are pMOS transistors and the transistors of the second type are nMOS transistors and, for each of the transistors, the first output terminal is a source terminal, the second output terminal is a drain terminal, and the control terminal is a gate terminal.

13. The differential line driver of claim 1 further comprising:
a second common node;
third and fourth transistors of a second conductivity type different from the first conductivity type, each transistor having a first output terminal coupled to the second common node, a second output terminal, and a control terminal, the control terminals of the third and fourth transistors coupling to the input node;
a third resistor coupled between the second output terminal of the third transistor and the first one of the differential output nodes; and
a fourth resistor coupled between the second output terminal of the fourth transistor and the second one of the differential output nodes; and
a fifth resistor coupled between the second power node and the second common node;
wherein the third and fourth resistors have substantially the same resistance value, and a sum of the resistances of the third resistor and the fifth resistor is approximately equal to N $Z_0$ ohms.

14. The differential line driver of claim 13 wherein the transistors of the first conductivity type are pMOS transistors and the transistors of the second type are nMOS transistors and, for each of the transistors, the first output terminal is a source terminal, the second output terminal is a drain terminal, and the control terminal is a gate terminal.

15. The differential line driver of claim 1, wherein the differential line driver is fabricated in an integrated circuit.

16. The differential line driver of claim 1 wherein the first and second power nodes are common for all of the differential line driver slices.

17. The differential line driver of claim 16 further comprising a voltage regulator coupled to first power node, adapted to provide a regulated voltage to the first power node.

18. The differential line driver of claim 17 wherein the driver is disabled by shutting off the voltage regulator.

19. The differential line driver of claim 1 wherein first resistor comprises a pass-transistor sized to provide a resistance approximately equal to the resistance value of the first resistor and the driver is disabled by turning off the pass-transistor.

20. The differential line driver of claim 19, wherein the first and second transistors have a breakdown voltage, and the pass-transistor has a breakdown voltage greater than the breakdown voltage of the first and second transistors.

21. The differential line driver of claim 1, wherein the transistors of the first conductivity type are PNP transistors and, for each of the transistors, the first output terminal is a emitter terminal, the second output terminal is a collector terminal, and the control terminal is a base terminal.

22. A differential line driver having an input node, differential output nodes for coupling to a transmission line with a characteristic impedance $Z_0$, and N driver slices, the driver slices comprising:
first and second power nodes, common to all driver slices, for coupling to a power supply;
a first node;
a first resistor coupled between the first power node and the first node;
first and second pMOS transistors, each transistor having a source terminal coupled to the first node, a drain terminal, and a gate terminal, the gate terminals of the first and second transistors coupling to the input node;
third and fourth nMOS transistors, each transistor having a source terminal coupled to the second power node, a drain terminal, and a gate terminal, the gate terminals of the third and fourth transistors coupling to the input node;
a second resistor coupled between the drain terminal of the first transistor and a first one of the differential output nodes;
a third resistor coupled between the drain terminal of the second transistor and a second one of the differential output nodes;
a fourth resistor coupled between the drain terminal of the third transistor and a first one of the differential output nodes; and
a fifth resistor coupled between the drain terminal of the fourth transistor and a second one of the differential output nodes;
first and second ESD protectors coupled between at least one of the power nodes and the respective first and second ones of the differential output nodes;
wherein the second and third resistors have substantially the same resistance value and a sum of the resistances of the first resistor and second resistor is approximately equal to N $Z_0$ ohms, and the fourth and fifth resistors each have substantially the same resistance value approximately equal to N $Z_0$ ohms, where N is an integer greater than or equal to one.

23. The differential line driver of claim 22 first and second resistors have a resistance greater than approximately one-tenth of (N $Z_0$) ohms.

24. The differential line driver of claim 22 wherein each ESD protector has at least a first and a second diode, the first diode connected between the respective differential output node and the first power node, and the second diode connected between the respective differential output node and the second power node.

25. The differential line driver of claim 22 wherein the first, second, third, and fourth transistors have a breakdown voltage that is less than a difference in voltage between the first and second power nodes.

26. The differential line driver of claim 22 wherein the input nodes of a subset of the N of the driver slices are adapted to be driven with data and the input nodes of remaining ones of the N driver slices are adapted to be driven with complemented data.

27. The differential line driver of claim 22 further comprising:
a pre-driver for each one of the driver slices, each pre-driver responsive to the input node and coupled to the gate terminals of the first, second, third, and fourth transistors, the second power node, and to a third power node, the third node adapted to have a voltage thereon between voltages on the first and second nodes and the voltage of the first node is chosen to have a voltage on the first node to be approximately equal to the voltage of the third node.

28. The differential line driver of claim 27 wherein each of the pre-drivers is adapted to force the driver slices to simultaneously produce a voltage on the first and second differential output nodes substantially equal to a voltage on the second supply node.

29. The differential line driver of claim 27, wherein each of the pre-drivers is adapted to force the driver slices into a high output impedance state.

* * * * *